United States Patent

[11] 3,628,331

[72] Inventor  Ronald L. Shellhause
              Vandalia, Ohio
[21] Appl. No. 76,474
[22] Filed     Sept. 29, 1970
[45] Patented  Dec. 21, 1971
[73] Assignee  General Motors Corporation
              Detroit, Mich.

[54] HYDRAULICALLY BALANCED OPEN CENTER HYDRAULIC POWER BRAKE
     2 Claims, 1 Drawing Fig.
[52] U.S. Cl. .................................... 60/54.6 P,
                                     91/431, 91/49
[51] Int. Cl. ........................................ F15b 7/00,
                                     F15b 13/02, F15b 11/08
[50] Field of Search ........................... 60/54.6 P,
                                     54.5 P; 91/431, 49, 434

[56]             References Cited
              UNITED STATES PATENTS
3,515,031  6/1970   McPherson ............... 91/431
3,353,451  11/1967  Garrison et al. ........... 91/431
3,148,592  9/1964   Schultz et al. ............ 60/54.6 P
2,957,311  10/1960  Stelzer ..................... 60/54.6 P

*Primary Examiner*—Martin P. Schwadron
*Assistant Examiner*—A. M. Zupcic
*Attorneys*—W. E. Finken and D. D. McGraw

ABSTRACT: A hydraulic power brake booster in a vehicle hydraulic system in which a pump supplies fluid to the power steering gear of the vehicle and then to the brake booster, after which the fluid is returned to the pump. The booster has an open center control valve and is provided with a hydraulic balance so that back pressure generated downstream of the booster will not be transmitted to the booster input member to which the brake pedal is connected.

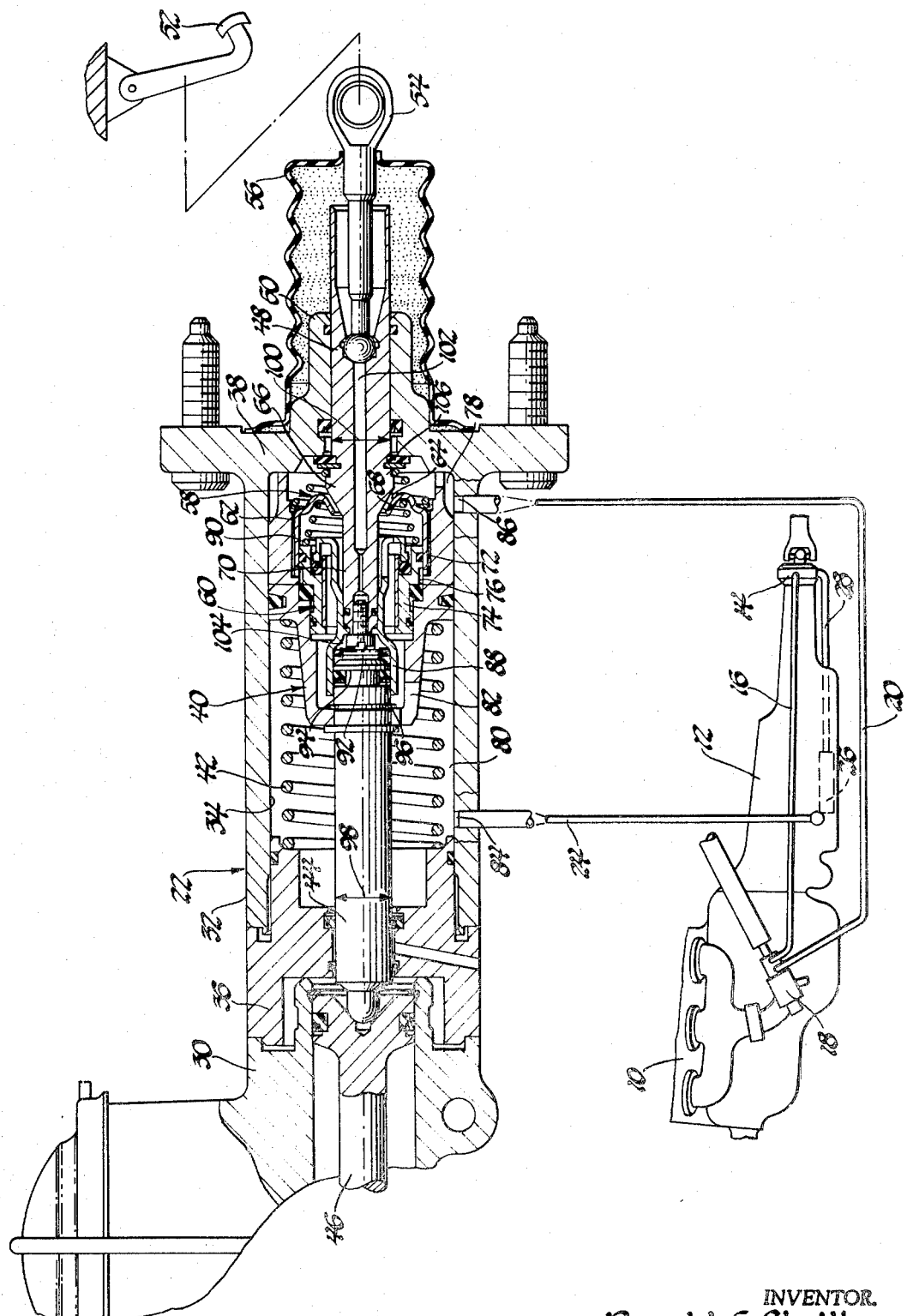

HYDRAULICALLY BALANCED OPEN CENTER HYDRAULIC POWER BRAKE

The invention relates to a hydraulic brake booster assembly, and more particularly to one having an open-center valve and adapted to be positioned in a hydraulic system containing other hydraulic devices which are likely to cause a back pressure downstream of the booster. When a hydraulic power brake unit is unbalanced and back pressure downstream of the unit occurs, an increase in break pedal effort takes place in proportion to the amount of back pressure. Sudden surges in flow produced by other components in the hydraulic system can also cause brake pedal load fluctuation. In some installations, it is advantageous to utilize a pump driven by the transmission output shaft to furnish hydraulic flow for available hydraulic pressure. With some pumps of this type the transmission will cause sufficient back pressure under certain phases of transmission operation to increase the break pedal effort if the booster is of the unbalanced type. When the booster is of the balanced type to which the invention relates, the change in back pressure will not affect the required pedal effort. Also, such a booster may be located in a system upstream of a power steering gear when such an installation is desired. unbalanced booster is used in series with the power steering gear, it is positioned downstream of the power steering gear to avoid an increased brake pedal effort due to back pressure created when the steering gear is operating. A balanced booster embodying the invention is not affected by back pressure since its input shaft, output shaft, and central "slip joint" reaction sleeve all have the same effective areas.

In the drawing:

The single figure shows a brake booster assembly embodying the invention with parts broken away and in section, the booster assembly being illustrated as being installed in a hydraulic system including a transmission-driven pump.

The vehicle in which the booster assembly embodying the invention is installed is illustrated as including an engine 10 driving an automatic transmission 12. A transmission output shaft driven pump 14 provides hydraulic flow and available pressure through the conduit 16 to the power steering gear 18, through the conduit 20 to the booster assembly 22, and returning through conduit 24 to the transmission 12. Since the pump 14 also provides hydraulic fluid for some phases of transmission operation, returning fluid is conducted through the schematically represented transmission valve body 26 and then through suitable transmission passage, represented by conduit 28, to the inlet of pump 14. While the booster assembly 22 is illustrated as being positioned downstream of the power steering gear 18, it can also as easily be positioned upstream of that gear. During some phases of transmission operation, pumps of the type represented by pump 14 will generate a back pressure through conduit 24 which is received by the booster assembly. Similarly, if the power steering gear 18 is downstream of the booster assembly 22, operation of the power steering gear will create a downstream back pressure received by the booster assembly. The invention is directed to the elimination of the effects of such a back pressure on brake pedal effort. The booster assembly 22 is arranged to actuate the master cylinder assembly 30, which, in turn, actuates the vehicle brakes in a manner will known in the art. The booster assembly includes a housing 32 formed to provide a cylinder 34 which has a forward end wall 36 and a rear end wall 38. The power piston 40 is reciprocably received in cylinder 34 and is urged to engage the rear end wall 38 by the piston return spring 42. The piston output push rod 44 is secured to the power wall 40 and extends through the forward end wall 36 to engage the master cylinder piston assembly 46. It can be seen that forward movement of power piston 40 will actuate the master cylinder through the push rod 44 and the piston assembly 46.

The booster assembly 22 has an input member 48 slidably mounted in the rearwardly extending sleeve 50 formed as a part of cylinder end wall 38. The brake pedal 52 is connected to actuate the booster assembly through the push rod 54 and the input member 48 to which push rod 54 is connected. A suitable boot 56 covers sleeve 50, the outer portion of input member 48 and the forward portion of push rod 54.

The power piston 40 is provided with a stepped recess which contains the control valve assembly 58, the reaction assembly 60, and the slip-joint portion of the booster pressure balancing mechanism. The valve assembly 58 includes valve seat 62 which has a conical valve seat face 64, and valve 66 formed on input member 48 and having a valve face 68. The input member 48 is provided with an extension 70 forward of valve 66 and positioned within the recess 72 of power piston 40. This is the recess in which the reaction assembly and the control valve assembly are mounted.

The reaction assembly includes reaction piston 74 reciprocably mounted in the power piston recess 72 and a portion of the valve seat 62 and so connected to define therewith a reaction chamber 76. This chamber is fluid connected to the inlet or power chamber 78 on the rearward side of power piston 40. The recess 72 downstream of the control valve assembly 58 is connected to the outlet or exhaust chamber 80 on the other side of power piston 40 through passage 82 in the power piston. Outlet chamber 80 is connected through outlet 84 to conduit 24, while inlet chamber 78 is connected through inlet 86 with conduit 20.

A reaction sleeve 88 has a central portion thereof secured about the end of extension 70 in sealing relation. The rearwardly extending portion of sleeve 88 is positioned to be engaged by reaction piston 74 upon sufficient movement of that piston against the line pressure support spring 90 to transmit reaction force, created by the pressure differential across power wall 40 and exerted on the reaction piston, to the input member 48 so that brake feel is transmitted to the vehicle operator through brake pedal 52. The sleeve 88 is suitably apertured to provide for relatively unrestricted fluid flow from the control valve assembly 58 through recess 72 and passage 82 and into outlet chamber 80. The forward end of sleeve 88 is formed as a cylinder having an effective area illustrated by arrow 92. This cylinder fits telescopically and in sliding relation over the rear end 94 of push rod 44, with a seal 96 between the push rod end 94 and the sleeve 88. The push rod 44, including its end 94, has an effective cross section area illustrated by the arrow 98, which is the same as the effective area illustrated by arrow 92. The part of input member 48 extending through end wall 38 has an effective cross section area illustrated by arrow 100 which is also the same as the effective areas illustrated by arrows 92 and 98. A passage 102 through the input member 48 extends into the balance chamber 104, which is formed by sleeve 88 and the adjacent ends of the input member 48 and the push rod 44. This passage connects the balance chamber to atmospheric pressure.

When the brake booster is to be operated, the vehicle operator depresses pedal 52, moving input member 48 forwardly to restrict the opening formed by faces 64 and 68 and cause a pressure differential to be exerted across power piston 40. The higher pressure created in the inlet chamber 78 overcomes the force of piston return spring 42 and moves the power piston forwardly. This also moves push rod 44 forwardly to actuate the master cylinder 30, which, in turn, actuates the vehicle brakes. Reaction force is transmitted from the reaction piston 74 to the sleeve 88, input member 48, and the push rod 54 when the force of spring 90 has been overcome. Upon brake release, the valve face 68 moves away from valve seat face 64, decreasing the pressure differential across power piston 40 and allowing the piston return spring 42 to move the piston rearwardly against its stop defined by cylinder rear end wall 38. The cushioned valve stop 106 is also provided which engages the cylinder rear end wall 38. By providing the same effective areas indicated by arrows 92, 98 and 100, any back pressure transmitted from conduit 24 to outlet chamber 80 will be transmitted into recess 72 and inlet chamber 78 so that the effective areas cancel out the effect of the back pressure. Thus, no increase in brake pedal effort will be required to actuate the booster assembly when such back pressure exists.

What is claimed is:

1. A hydraulic brake booster comprising:

a cylinder having a power wall movable therein and defining therewith a hydraulic fluid inlet chamber and a hydraulic fluid outlet chamber;

open center valve means received within said power wall for controlling hydraulic fluid flow from said inlet chamber to said outlet chamber and thereby controlling the pressure differential acting across said power wall, said valve means including a valve seat and a reaction piston mounted in said power wall and a valve member extending through one end wall of said cylinder and through said inlet chamber and having a valve thereon extending into valving relation with said valve seat and movable to control said booster;

an output member extending into and secured to said power wall and extending through said outlet chamber and through another end wall of said cylinder to actuate a master cylinder upon actuating movement of said power wall;

said valve member, where is extends through said one cylinder end wall, and said output member, where it extends into said power wall and where it extends through said cylinder another end wall, having same effective cross section areas;

and reaction sleeve means sealingly secured to said valve member downstream of said valve seat and telescopically fitting in sealed and sliding relation over the portion of said output member extending into said power wall and defining with the adjacent ends of said valve member and said output member a balancing chamber, one of said members having a passage therethrough connecting said balancing chamber with atmosphere.

2. In a hydraulic power brake booster having a power wall and an output member connected thereto, said power wall being subject to pressure surges from the downstream side:

an open center valve assembly for controlling hydraulic pressure differential across said power wall, said valve assembly comprising.

an input member having a valve formed thereon; a valve seat cooperating with said valve to control said hydraulic pressure differential;

a reaction piston having opposed surfaces, one of said surfaces and a portion of the other of said surfaces being exposed to hydraulic pressure downstream of said valve and valve seat and another portion of said other of said surfaces being exposed to hydraulic pressure upstream of said valve and valve seat, a reaction sleeve secured to said input member downstream of said valve and valve seat and engageable by said reaction piston when a sufficient difference in pressures upstream and downstream of said valve and valve seat is generated by closing movement of said valve relative to said valve seat to transmit reaction to said input member, said sleeve fitting in sealed telescoping relation over one end of said output member and defining with said one end of said output member and one end of said input member a balance chamber, the other ends of said input member and said output member being exposed to atmospheric pressure and having the same effective areas as the effective area of said one end of said output member received in telescoping relation in said sleeve, one of said members having a passage therethrough connecting said balance chamber with atmospheric pressure, said same effective areas preventing pressure surges from downstream of said power wall from being transmitted to effect the forces on said input member or said output member.

\* \* \* \* \*

PO-1050
(5/69)

UNITED STATES PATENT OFFICE
CERTIFICATE OF CORRECTION

Patent No. __3,628,331__    Dated __December 21, 1971__

Inventor(s) __Ronald L. Shellhause__

It is certified that error appears in the above-identified patent and that said Letters Patent are hereby corrected as shown below:

Column 1, line 23, before the word "unbalanced" insert -- When an --.
Column 1, line 46, the word "passage" should read -- passages --.
Column 1, line 60, the word "will" should read -- well --.
Column 3, Claim 1, line 19, the word "is" should read -- it --.
Column 4, Claim 2, line 3, after the word "comprising" insert a colon -- : --.

Signed and sealed this 17th day of October 1972.

(SEAL)
Attest:

EDWARD M. FLETCHER, JR.
Attesting Officer

ROBERT GOTTSCHALK
Commissioner of Patents